UNITED STATES PATENT OFFICE.

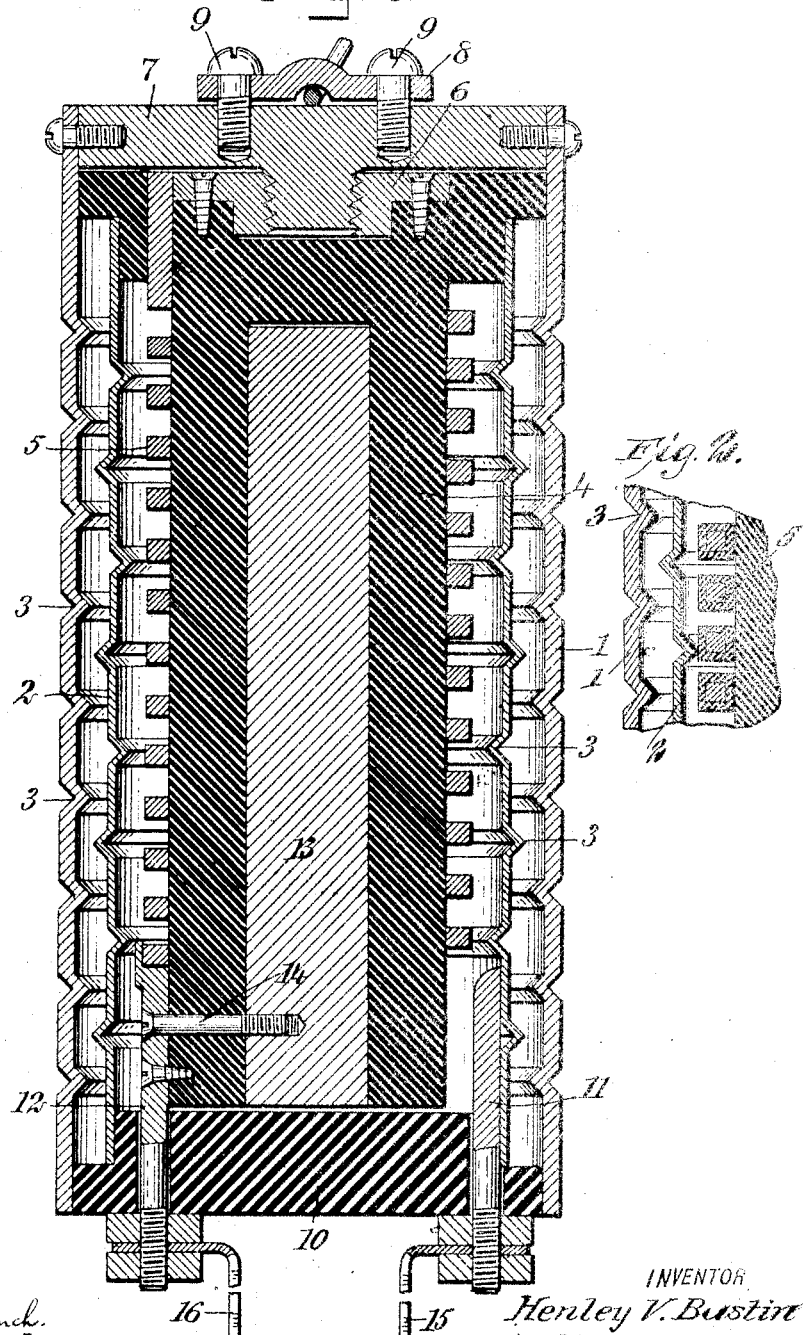

HENLEY VEDDER BASTIN, OF LANCASTER, KENTUCKY.

LIGHTNING-ARRESTER.

No. 883,613.  Specification of Letters Patent.  Patented March 31, 1908.

Application filed October 12, 1907. Serial No. 397,088.

*To all whom it may concern:*

Be it known that I, HENLEY VEDDER BASTIN, a citizen of the United States, and a resident of Lancaster, in the county of Garrard and State of Kentucky, have invented a new and Improved Lightning-Arrester, of which the following is a full, clear, and exact description.

This invention contemplates the provision of an improved lightning arrester, the same being designed to facilitate as much as practical the discharge or separation of high potential currents from the dynamic or useful current in electrical circuits. This I accomplish by a coil, forming a part of the circuit and surrounded by a line cylinder and a ground cylinder, the ground cylinder being located between the coil and the line cylinder, each presenting a large number of points or edges whereby little resistance to the currents of high potential in passing from both the coil and line cylinder to the ground, will be offered.

The invention, from a mechanical standpoint, further provides for the compact and easy assemblage of the parts and for their convenient inspection and protection from the elements.

Reference is to be had to the accompanying drawings forming a part of this specification, in which similar characters of reference indicate corresponding parts in both the views.

Figure 1 is a longitudinal central section of a lightning arrester embodying my invention; and Fig. 2 is a like fragmentary sectional view showing a slight modification of the construction.

More specifically described, my improved lightning arrester as preferably constructed comprises a line cylinder 1 and a ground cylinder 2, the latter being concentrically arranged within the line cylinder and each being provided with a series of transverse V-shaped corrugations 3, the corrugations of the line cylinder 1 having their sharpened edges on the interior, and the corrugations of the ground cylinder 2 having their sharpened edges both interiorly and exteriorly alternating with each other and arranged in the interval of the corrugations in the line cylinder.

Within the ground cylinder 2, surrounding an insulating cylinder 4, is a coil 5 forming a part of the electrical circuit, the same being of angular cross-section and either insulated, as shown in Fig. 2, or exposed as shown in Fig. 1. The coil 5 connects at one end, which as shown is at the top, with a flanged internally-threaded coupling 6 attached within a counterbored recess concentrically formed in the head of the insulating cylinder 4. Threaded within this coupling 6 is the central projecting portion or stud of a plug 7, the latter also being secured to the line cylinder as by the machine screws shown, and operating not only as a conductor between the line wire and the coil, and the line cylinder, but also inclosing this end of the said cylinder and supporting the inclosed parts. For attaching the line wire to the plug 7, the latter is provided with a clamp in the nature of a plate 8 having a groove on its under face for receiving the wire and operating to forcibly press the same to the plug under the action of the screws 9.

The opposite end of the line cylinder 1 is closed and supports the adjacent parts at this end of the arrester by an insulating plug 10, the latter having a reduced portion which passes within the ground cylinder and is provided with openings through which pass the terminals 11 and 12 of the ground cylinder and coil, respectively; the last-named terminal having electrical contact with the coil, and is held in place by the aid of a screw 14 which passes through the insulating cylinder 4, and is threaded into and supports an inner iron core 13. Each of the terminals 11 and 12 is threaded exteriorly of the plug 10 for receiving suitable nuts between which are clamped clips 15 and 16 respectively. To the clips 15 and 16, the ground wire and the continuation of the line wire may be respectively attached as by soldering, or these wires may be directly secured between the nuts of their respective terminals.

By the construction of my improved lightning arrester as hereinbefore described and as illustrated, it will be observed that the ground and line cylinders present a large number of sharp points or edges as also does the coil 5, whereby currents of high potential will be discharged from both the coil and line cylinder to the ground cylinder and thereby conducted to the ground. The coil 5 will also offer a substantial impedance to the passage of high frequency currents to the terminal 12; thus permitting only the dynamic or useful current to pass through the arrester.

While the construction and arrangement of my improved lightning arrester as shown is the preferred embodiment of my invention, I nevertheless recognize that the same may be changed in particulars without departing from the nature of the invention as defined in the annexed claims:

Having thus described my invention, I claim as new and desire to secure by Letters Patent:

1. In a device of the character described, a coil adapted to form a part of an electrical circuit, a ground cylinder surrounding said coil, and a line cylinder in connection with said circuit and surrounding the ground cylinder.

2. In a device of the character described, means adapted to form a part of an electrical circuit offering an impedance to high frequency currents, and a ground cylinder surrounding said means and provided with projecting points or edges, for the purpose described.

3. In a device of the character described, a coil adapted to form a part of an electrical circuit, a ground cylinder surrounding said coil provided with projecting edges, and a line cylinder in connection with said circuit and surrounding the ground cylinder, having projecting edges arranged in the intervals of the said edges carried by the ground cylinder.

4. In a device of the character described, a coil adapted to form a part of an electrical circuit, a ground cylinder having V-shaped transverse corrugations providing internally and externally-projecting edges alternating with each other, and a line cylinder in connection with said circuit and surrounding the ground cylinder, having transverse V-shaped corrugations providing internally-projecting edges arranged in the intervals of the said edges carried by the ground cylinder.

5. In a device of the character described, a coil of angular cross-section adapted to form a part of an electrical circuit, a ground cylinder surrounding said coil, having projecting points or edges internally and externally thereof, and a line cylinder in connection with said circuit and surrounding the ground cylinder, having internally-projecting points or edges.

6. In a device of the character described, the combination of an insulated core, a helical conductor surrounding the core, a cylinder electrically connected with the conductor, and a ground cylinder located intermediate the conductor and the first-named cylinder.

7. In a device of the character described, the combination of a cylinder of conducting material, a plug of conducting material closing one end of said cylinder and secured thereto, means for attaching a line wire to said plug, an insulating plug closing the opposite end of said cylinder, an insulated core supported between said plugs within said cylinder, a helical conductor surrounding the core and connected with the conducting plug, and a ground cylinder located intermediate the helical conductor and the first-named cylinder.

8. In a device of the character described, the combination of an insulated core, a helical conductor surrounding said core adapted to be electrically connected with a line wire, a line cylinder surrounding the conductor, and a ground cylinder located intermediate the conductor and the line cylinder.

In testimony whereof I have signed my name to this specification in the presence of two subscribing witnesses.

HENLEY VEDDER BASTIN.

Witnesses:
C. D. WALKER,
W. O. RIGNEY.